US012766974B2

(12) United States Patent
Song et al.

(10) Patent No.: US 12,766,974 B2
(45) Date of Patent: Oct. 20, 2026

(54) SYSTEM AND METHOD FOR CONTROLLING ELECTRIC VEHICLE

(71) Applicants: HYUNDAI MOTOR COMPANY, Seoul (KR); Kia Corporation, Seoul (KR)

(72) Inventors: Soo Han Song, Hwaseong-si (KR); Joseph D Chang, Hwaseong-si (KR); Seong Hwan Cheong, Hwaseong-si (KR); Sung Hyun Cho, Hwaseong-si (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 85 days.

(21) Appl. No.: 18/796,967

(22) Filed: Aug. 7, 2024

(65) Prior Publication Data

US 2025/0058645 A1 Feb. 20, 2025

(30) Foreign Application Priority Data

Aug. 14, 2023 (KR) ........................ 10-2023-0106063
May 20, 2024 (KR) ........................ 10-2024-0065059

(51) Int. Cl.
*B60L 15/20* (2006.01)

(52) U.S. Cl.
CPC ........... *B60L 15/20* (2013.01); *B60L 2240/12* (2013.01); *B60L 2240/24* (2013.01); *B60L 2240/423* (2013.01); *B60L 2250/26* (2013.01)

(58) Field of Classification Search
CPC .. B60L 15/20; B60L 2240/12; B60L 2240/24; B60L 2240/423; B60L 2250/26
See application file for complete search history.

(56) References Cited

U.S. PATENT DOCUMENTS

2022/0089174 A1* 3/2022 Oh ........................ B60W 50/14
2022/0169237 A1* 6/2022 Hu ...................... B60W 30/182
2023/0234589 A1* 7/2023 Kanzaki .............. B60L 15/2081
701/22

FOREIGN PATENT DOCUMENTS

KR 10-2022-0077261 A 6/2022

* cited by examiner

*Primary Examiner* — Alan D Hutchinson
(74) *Attorney, Agent, or Firm* — Morgan Lewis & Bockius LLP

(57) ABSTRACT

In a system and method for controlling the electric vehicle, the method for controlling the electric vehicle may be performed by a controller. The method may include obtaining virtual shift information based on drive information of the electric vehicle, detecting a power-on upshift based on the virtual shift information, in response to the detecting of the power-on upshift, determining whether a set condition for push-feel control is satisfied, and based on whether the set condition is satisfied, performing a torque control for a motor of the electric vehicle in either a normal control mode or a push-feel control mode.

18 Claims, 6 Drawing Sheets

SYSTEM AND METHOD FOR CONTROLLING ELECTRIC VEHICLE

CROSS-REFERENCE TO RELATED APPLICATION

The present application claims priority to Korean Patent Applications No. 10-2023-0106063 and No. 10-2024-0065059, filed on Aug. 14, 2023 and May 20, 2024, the entire contents of which is incorporated herein for all purposes by this reference. BACKGROUND OF THE PRESENT DISCLOSURE

FIELD OF THE PRESENT DISCLOSURE

The present disclosure relates to an electric vehicle. More particularly, the present disclosure relates to controlling of the electric vehicle.

DESCRIPTION OF RELATED ART

An electric vehicle is a vehicle driven by a motor, and recently, active research and development on electric vehicles are being conducted.

An electric vehicle is provided with a reducer configured to reduce the rotation number of the motor, and unlike an internal combustion engine vehicle, does not need a multi-stage transmission. Therefore, the electric vehicle may provide a smooth ride without interruption that occurs in multi-stage shifting, whereas the enjoyment of driving caused by the multi-stage shifting may be lessened in the electric vehicle.

The information included in this Background of the present disclosure is only for enhancement of understanding of the general background of the present disclosure and may not be taken as an acknowledgement or any form of suggestion that this information forms the prior art already known to one having ordinary skilled in the art.

BRIEF SUMMARY

Various aspects of the present disclosure are directed to providing a system and method for controlling an electric vehicle, configured for providing a shifting sensation occurred in an internal combustion engine vehicle to the electric vehicle.

Another object of the present disclosure is to provide a system and method for controlling an electric vehicle, configured for allowing a driver of the electric vehicle to experience sporty and dynamic driving like in an internal combustion engine vehicle.

Yet another object of the present disclosure is to provide a system and method for controlling an electric vehicle, configured for improving the marketability of the electric vehicle.

The object of the present disclosure is not limited to the foregoing, and other objects not mentioned herein will be clearly understood by one having ordinary skill in the art to which the present disclosure pertains based on the description below.

The features of the present disclosure to achieve the object of the present disclosure as described above and to perform the characteristic functions of the present disclosure to be described later are as follows.

According to some forms of the present disclosure, a method for controlling an electric vehicle includes obtaining, by a controller, virtual shift information based on drive information of the electric vehicle, detecting, by the controller, a power-on upshift based on the virtual shift information, in response to the detecting of the power-on upshift, determining, by the controller, whether a set condition for push-feel control is satisfied, and based on whether the set condition is satisfied, performing, by the controller, a torque control for a motor of the electric vehicle in any one of a normal control mode or a push-feel control mode.

According to some forms of the present disclosure, a system for controlling an electric vehicle includes a virtual shift system configured to obtain virtual shift information of the electric vehicle based on drive information of the electric vehicle, and a controller configured to determine whether a virtual shifting is performed based on the virtual shift information. The controller may be programmed to perform detecting a power-on upshift based on the virtual shift information, determining, in response to the detecting of the power-on upshift, whether a set condition for push-feel control is satisfied, and performing, based on whether the set condition is satisfied, a torque control for a motor of the electric vehicle in either a normal control mode or a push-feel control mode.

Other aspects and embodiments of the present disclosure are discussed infra.

It is to be understood that the term "vehicle" or "vehicular" or other similar terms as used herein are inclusive of motor vehicles in general, such as passenger automobiles including sports utility vehicles (SUVs), buses, trucks, various commercial vehicles, watercraft including a variety of boats and ships, aircraft, and the like, and include hybrid vehicles, electric vehicles, plug-in hybrid electric vehicles, hydrogen-powered vehicles, and other alternative fuel vehicles (e.g., fuels derived from resources other than petroleum). As referred to herein, a hybrid vehicle is a vehicle that has two or more sources of power, for example, a vehicle powered by both gasoline and electricity.

The methods and apparatuses of the present disclosure have other features and advantages which will be apparent from or are set forth in more detail in the accompanying drawings, which are incorporated herein, and the following Detailed Description, which together serve to explain certain principles of the present disclosure.

The above and other features of the present disclosure are discussed infra.

Figure 1:
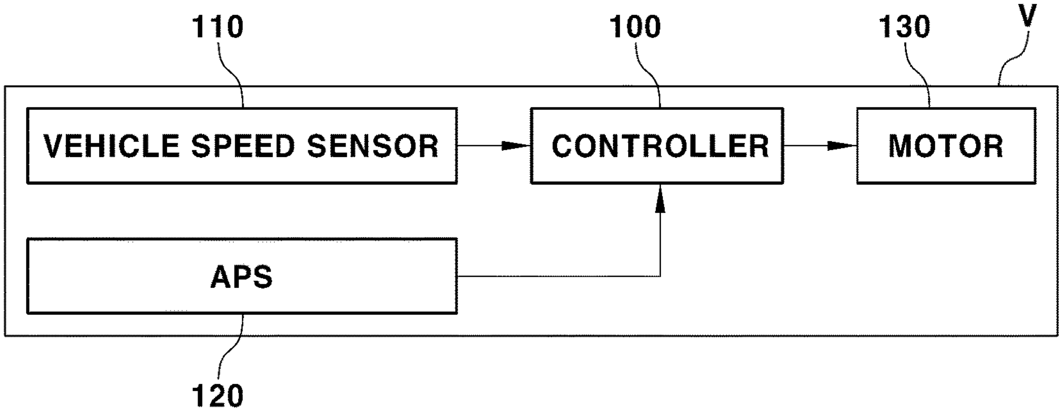
FIG. 1 is a diagram of a system for controlling an electric vehicle according to an embodiment of the present disclosure.

It should be understood that the appended drawings are not necessarily to scale, presenting a somewhat simplified representation of various features illustrative of the basic principles of the present disclosure. The specific design features of the present disclosure, including, for example, specific dimensions, orientations, locations, and shapes, will be determined in part by the particular intended application and usage environment.

In the figures, the reference numbers refer to the same or equivalent parts of the present disclosure throughout the several figures of the drawing.

DETAILED DESCRIPTION

Reference will now be made in detail to embodiments of the present disclosure(s), examples of which are illustrated in the accompanying drawings and described below. While the present disclosure(s) will be described in conjunction with embodiments of the present disclosure, it will be understood that the present description is not intended to limit the present disclosure(s) to those embodiments of the present disclosure. On the other hand, the present disclosure (s) is/are intended to cover not only the embodiments of the present disclosure, but also various alternatives, modifications, equivalents and other embodiments, which may be included within the spirit and scope of the present disclosure as defined by the appended claims.

Descriptions of specific structures or functions presented in the embodiments of the present disclosure are merely for explaining the embodiments according to the concept of the present disclosure, and the embodiments according to the concept of the present disclosure may be implemented in various forms. In addition, the descriptions should not be construed as being limited to the embodiments described herein, and should be understood to include all modifications, equivalents and substitutes falling within the idea and scope of the present disclosure.

Meanwhile, in an embodiment of the present disclosure, terms such as "first" and/or "second" may be used to describe various components, but the components are not limited by the terms. These terms are only used to distinguish one component from another. For example, a first component could be termed a second component, and similarly, a second component could be termed a first component, without departing from the scope of embodiments of the present disclosure.

It will be understood that, when a component is referred to as being "connected to" or "brought into contact with" another component, the component may be directly connected to or brought into contact with the other component, or intervening components may also be present. In contrast, when a component is referred to as being "directly connected to" or "brought into direct contact with" another component, there is no intervening component present. Other terms used to describe relationships between components should be interpreted in a like fashion (e.g., "between" versus "directly between," "adjacent" versus "directly adjacent," etc.).

Throughout the specification, like reference numerals indicate like components. The terminology used herein is for the purpose of illustrating embodiments and is not intended to limit the present disclosure. In the present specification, the singular form includes the plural sense, unless specified otherwise. The terms "comprises" and/or "comprising" used in the present specification mean that the cited component, step, operation, and/or element does not exclude the presence or addition of one or more of other components, steps, operations, and/or elements.

Hereinafter, the present disclosure is described in detail with reference to the accompanying drawings.

As shown in FIG. 1, an electric vehicle V includes a motor 130. The electric vehicle V may be driven by the motor. In one example, the electric vehicle V may be a battery electric vehicle. The electric vehicle V may be driven at least partially by the motor 130. In one example, the electric vehicle V may be a hybrid electric vehicle.

The electric vehicle V driven by the motor 130 includes a reducer but may not include the transmission of an internal combustion engine vehicle. Therefore, the electric vehicle V may lack shifting sensation generated by the transmission of the internal combustion engine vehicle. For the present reason, the electric vehicle V according to an embodiment of the present disclosure includes a virtual shift system. The virtual shift system may provide the same shifting sensation generated in the internal combustion engine vehicle to the electric vehicle V, adding the enjoyment of driving to the electric vehicle V.

In an embodiment of the present disclosure, the virtual shift system may be configured to generate a torque and virtual shifting sensation corresponding to a virtual gear position, based on the torque of the motor 130. In an embodiment of the present disclosure, the virtual shift system may provide a calculated virtual engine speed and virtual gear position to a driver. For example, the virtual shift system may display a virtual engine speed and virtual gear position on a cluster provided within a cabin of the electric vehicle V. In an embodiment of the present disclosure, the virtual shift system may output a virtual engine sound corresponding to the virtual engine speed and virtual gear position through a speaker provided inside and/or outside the vehicle.

The operation of the virtual shift system may be controlled and monitored by a controller 100 provided in the vehicle. In some examples, the electric vehicle V may be provided with one or more controllers for the virtual shift system. In some examples, the controller 100 may be configured to communicate with a vehicle controller. In another example, the controller 100 may be integrated with the vehicle controller. The controller 100 is configured to communicate with various components of the electric vehicle V, e.g., a vehicle speed sensor 110, an accelerator pedal sensor 120, a steering angle sensor, etc. Moreover, the controller 100 may be configured for controlling the motor 130. For example, the controller 100 is configured to control the torque of the motor 130.

The controller 100 may be configured to determine a virtual gear position (gear a, $a \geq 0$) of the electric vehicle V. The virtual gear position may be determined based on the vehicle speed and the opening amount of an accelerator pedal. The controller 100 may obtain in real time the opening amount of the accelerator pedal input by a driver from the accelerator pedal sensor (APS) 120 provided in the electric vehicle V. Moreover, the controller 100 may obtain the vehicle speed of the electric vehicle V in real time from the vehicle speed sensor 110 provided in the electric vehicle V. In some implementations, the vehicle speed of the electric vehicle V may be determined from a wheel speed sensor of the electric vehicle V. For example, the vehicle speed may be obtained as an average speed of left and right driving wheels.

The controller 100 may obtain a virtual engine speed (rotation number, RPM) at each virtual gear position (gear a, a≥0) of the electric vehicle V. The virtual engine speed may be determined based on the average vehicle speed, dynamic radius of a tire, and virtual gear ratio of the electric vehicle V. The average vehicle speed may be the average speed of the left and right driving wheels of the electric vehicle V, and the virtual gear ratio may be determined depending on the virtual gear position.

The power-on upshift, which is one of the shift conditions of the vehicle, is an upshift when the accelerator pedal is applied. When an upshift torque profile control in an internal combustion engine vehicle is identically used in the virtual shift system of the electric vehicle V, there is a limit in creating a push-feel shifting sensation at wide open throttle (WOT) due to the hardware characteristics of the motor. Here, “push-feel” is a shifting sensation that provides a sensation of push from behind the vehicle while driving.

Figure 2:
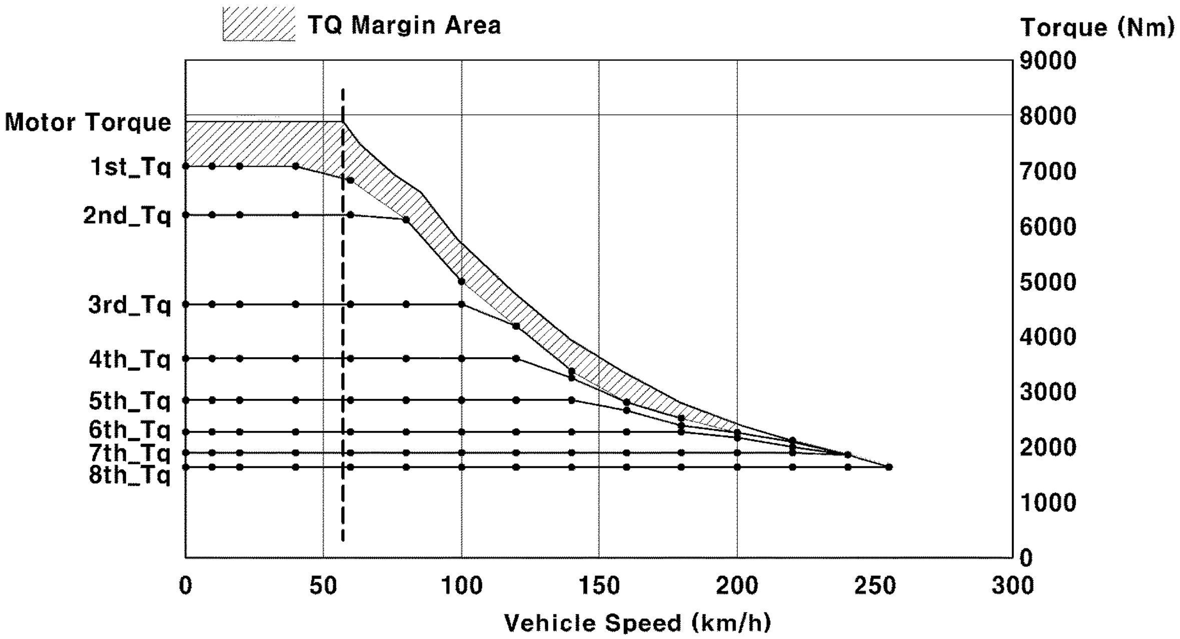
FIG. 2 shows T-N (Torque-Number of rotation) curves for a motor.

As shown in FIG. 2, due to the hardware characteristics of the motor, the maximum torque tends to rapidly decrease at a predetermined rotation number (the rotation number at 60 kilometers per hour in the shown embodiment). To imitate a push-feel shifting, which is a shifting specialized for high-performance vehicles among internal combustion engine vehicles, a torque margin (TQ margin area) is secured. However, as the hardware characteristics of the motor affect acceleration performance from the point where the torque starts bending in the graph, so there is a limit in securing a sufficient torque margin.

To overcome the limitation, in an embodiment of the present disclosure, the torque during shifting is controlled to intentionally deviate from the torque range before or after shifting by correcting the existing torque profile, unlike normal shifting, to imitate the push-feel shifting sensation at WOT.

Figure 3:
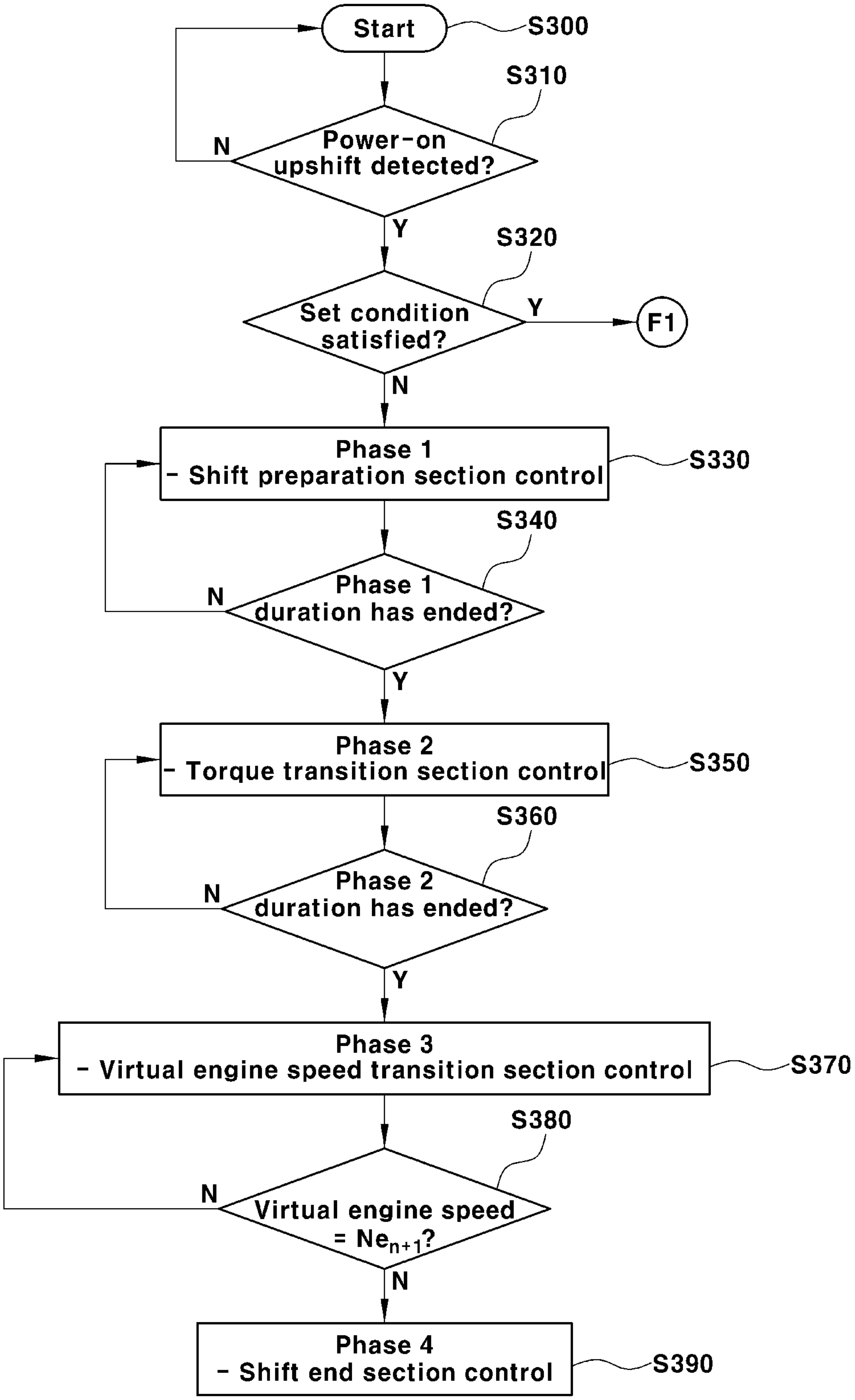
FIG. 3 is a flowchart showing a control of an electric vehicle according to an embodiment of the present disclosure.
Figure 4:
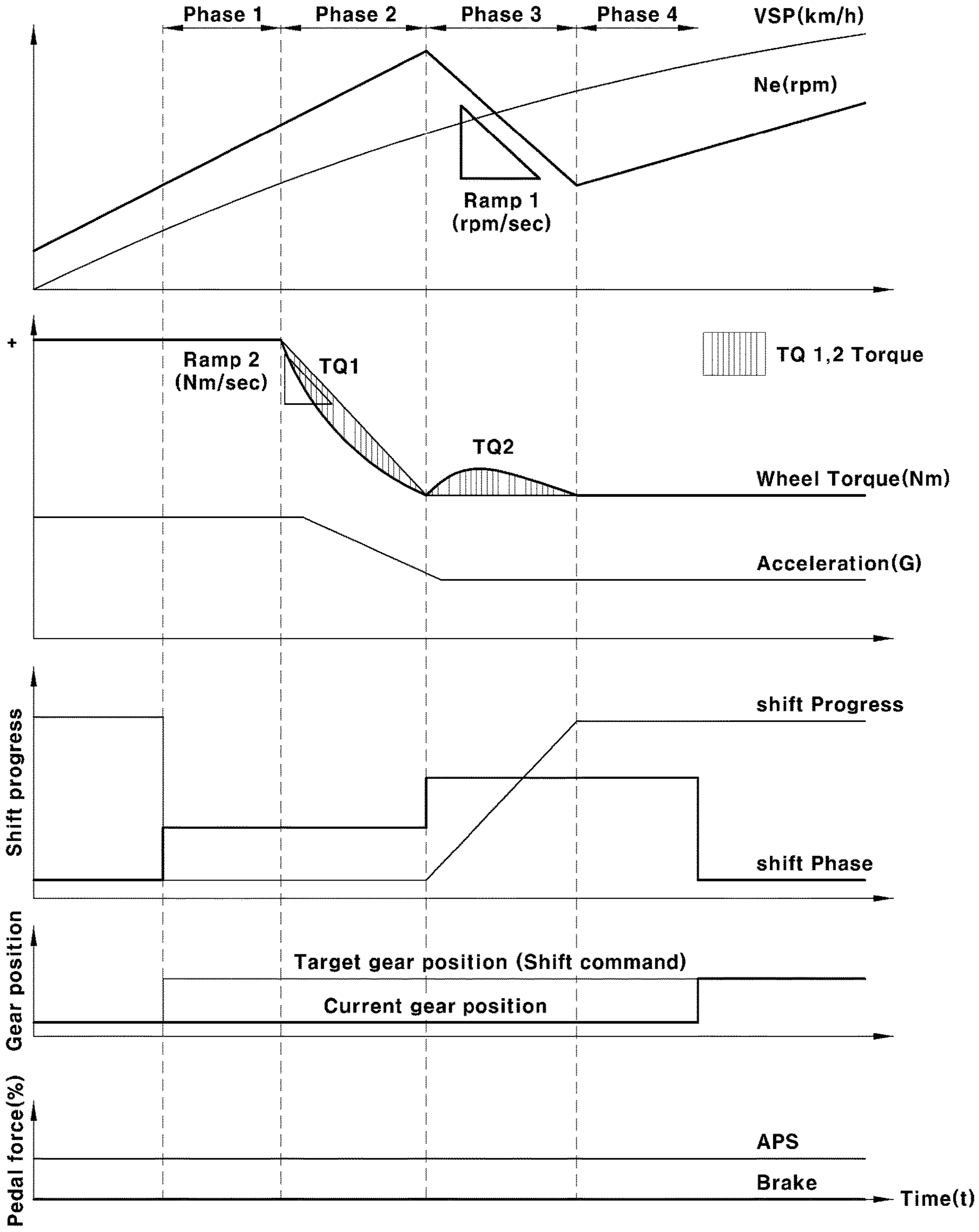
FIG. 4 shows changes in virtual shift information and drive information of an electric vehicle as time passes in a normal control mode according to an embodiment of the present disclosure.

Referring to FIG. 3 and FIG. 4, according to an embodiment of the present disclosure, the controller 100 may perform a control to generate a push feel at WOT.

At operation S300, the controller 100 is configured to perform a torque control for the motor 130 of the electric vehicle V.

At operation S310, the controller 100 is configured to detect whether a power-on upshift occurs. The controller 100 may be configured to determine whether a power-on upshift occurs, based on the opening amount of the accelerator pedal and the virtual shift information of the virtual shift system. When a virtual gear position shifts up by the virtual shift system while the accelerator pedal is applied, the controller 100 may be configured to determine that a power-on upshift has occurred. When power-on upshift is detected, the controller 100 may be configured for controlling a torque profile of the motor 130 in control modes including a normal control mode or a push-feel control mode.

When power-on upshift is detected, the controller 100 is configured to determine whether a set condition for push-feel control is satisfied, at operation S320. When the set condition is not satisfied, the controller 100 is configured to control the torque of the motor 130 in the normal control mode, at operations S330 through S390. Conversely, when the set condition is satisfied, the controller 100 may be configured for controlling the torque of the motor 130 in the push-feel control mode (proceeding to F1 in FIG. 5).

Whether the set condition is satisfied may be determined based on actual or virtual drive information of the vehicle. In an embodiment of the present disclosure, the set condition may be determined based on at least some of a current drive mode of the electric vehicle V, an opening amount of the accelerator pedal, a steering angle, or a virtual engine speed. For example, in response to determining that the current drive mode of the electric vehicle V is a high-performance drive mode, such as a sports mode, the opening amount of the accelerator pedal is greater than or equal to a predetermined value (e.g., 95% or above), the steering angle includes a value within a predetermined range, and the virtual engine speed is equal to or smaller than a predetermined value, the controller 100 may be configured to determine that the set condition for push-feel control is satisfied. In other words, in an embodiment of the present disclosure, when all of the above four conditions are satisfied, the controller 100 may be configured to determine that the set condition for push-feel control is satisfied. Here, the drive mode is a driving control system saved in the vehicle, configured to automatically change vehicle performance depending on driver’s preferences. The drive mode may include an eco-mode, sports mode, normal drive mode, etc., and is well-known in the field of the present disclosure, so description thereof will be omitted.

When the set condition is not satisfied, the controller 100 is configured to perform a normal mode control according to operations S330 through S390. In the normal control mode, a torque profile control according to the power-on upshift is performed, rather than performing the push-feel control.

According to an implementation of the present disclosure, the normal control mode and the push-feel control mode may each include four phases.

Phase I is a shift preparation section, and the controller 100 maintains a torque at an initial torque during Phase 1 in response to a shift command. Here, the initial torque is a torque required before shifting, i.e., a torque required at a current virtual gear position. Phase II is a torque transition section, and the controller 100 may perform a control of reducing the torque from the initial torque to a final torque. Here, the final torque is a torque required after shifting, i.e., a torque required at a target virtual gear position. Phase III is a virtual engine speed transition section, and the controller 100 is configured to perform a control of at least partially increasing the torque by a set torque from the final torque and is configured to perform a torque control based on a virtual engine speed. Phase IV is a shift end section, and the torque is maintained at the final torque.

Additionally referring to FIG. 4, in response to the set condition not being satisfied, the controller 100 enters the normal control mode at operation S330.

In Phase I, a shift command from the current virtual gear position to a target virtual gear position is provided to the controller 100. In response to the shift command, the controller 100 maintains the torque at an initial torque $TQ_n$ required at the current virtual gear position in the duration of Phase I, at operation S340. Hereinafter, the virtual gear position is referred to as a gear position.

The controller 100 is configured to determine whether a predetermined time period has passed since entering Phase I, at operation S340. After proceeding Phase I for the predetermined time period, the controller 100 ends Phase I.

At operation S350, the controller 100 enters Phase II. In Phase II, the controller 100 is configured to perform a control of reducing the torque of the motor 130 from the initial torque $TQ_n$ to a final torque $TQ_{n+1}$. As described above, the initial torque $TQ_n$ is a torque required at a current gear position, and the final torque $TQ_{n+1}$ is a torque required at a target gear position.

As shown in the drawing, the torque TQ in Phase II generally decreases in proportion to Ramp 2 as time passes.

The torque TQ changing along the slope of Ramp 2 becomes a reference torque. Ramp 2 may be determined according to Equation 1.

$$\text{Ramp } 2 = (TQ_{n+1} - TQ_n)/t_{TOT}, \quad \text{[Equation 1]}$$

wherein $t_{TOT}$ is a total operation time of Phase II.

However, according to a predetermined map, a first map factor F1 is reflected on a detailed shifting sensation as time passes, and in Phase II, the torque of the motor 130 may be controlled according to Equation 2 below.

$$TQ = \{TQ_n + (\text{Ramp } 2)\cdot t\} + TQ1\cdot F1, \quad \text{[Equation 2]}$$

wherein t is a time elapsed after entering Phase II, and TQ1 is an absolute torque in Phase II added to the reference torque. Moreover, TQ1 is a value to decrease the torque below the maximum torque at the target gear position, which is a shift position after upshifting. The maximum torque at the target gear position is a preset value considering the virtual gear ratio and the hardware specifications of the motor. The first map factor F1 is a preset factor which is multiplied by TQ1 according to the correlation between gear position and virtual engine speed.

At operation S360, the controller 100 is configured to determine whether a predetermined time period has passed since entering Phase II. After proceeding Phase II for the predetermined time period, the controller 100 ends Phase 2.

At operation S370, the controller 100 enters Phase III. In Phase 3, the controller 100 may perform a control of at least partially increasing the torque by a set torque from the final torque in Phase II.

Phase III is a section where a virtual engine speed Ne decreases, and during Phase 3, the virtual engine speed Ne may generally decrease in proportion to a preset Ramp 1. The controller 100 converts the time at which transition of the virtual engine speed Ne occurs into a shift progress rate. The controller 100 is configured to perform a torque control based on the converted shift progress rate. A detailed shifting sensation as time passes is generated using a displayed TQ2 value. TQ2 is an absolute torque in Phase III and is a value to increase the torque above the maximum torque of the current gear position, which is the current shift position. The maximum torque of the current gear position may be preset considering the virtual gear ratio and the hardware specifications of the motor. Torque TQ in Phase III may be obtained according to Equation 3.

$$TQ = TQ_{n+1} + TQ2\cdot F2, \quad \text{[Equation 3]}$$

wherein F2 is a factor which is multiplied by TQ2 according to the correlation between gear position and virtual engine speed.

At operation S380, the controller 100 is configured to determine whether the virtual engine speed Ne has reached a virtual engine speed $Ne_{n+1}$ at the target gear position. When it is determined that Ne has reached $Ne_{n+1}$, the controller 100 ends Phase III.

At operation S390, the controller 100 enters Phase IV. In Phase IV, the controller 100 synchronizes the torque to the torque $TQ_{n+1}$ required at the target gear position and ends the normal control mode.

Figure 5:
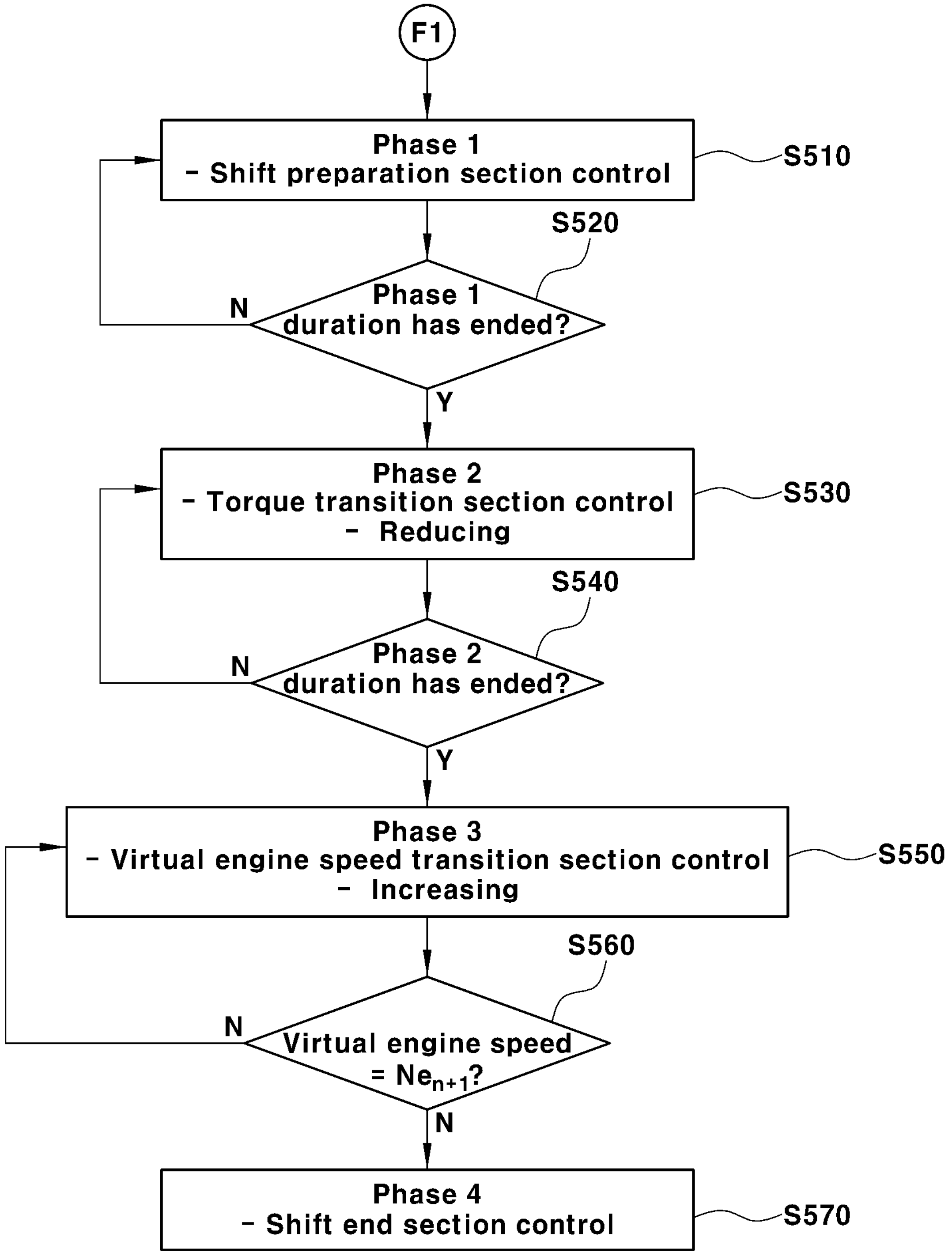
FIG. 5 is a flowchart showing a control of an electric vehicle according to an embodiment of the present disclosure.
Figure 6:
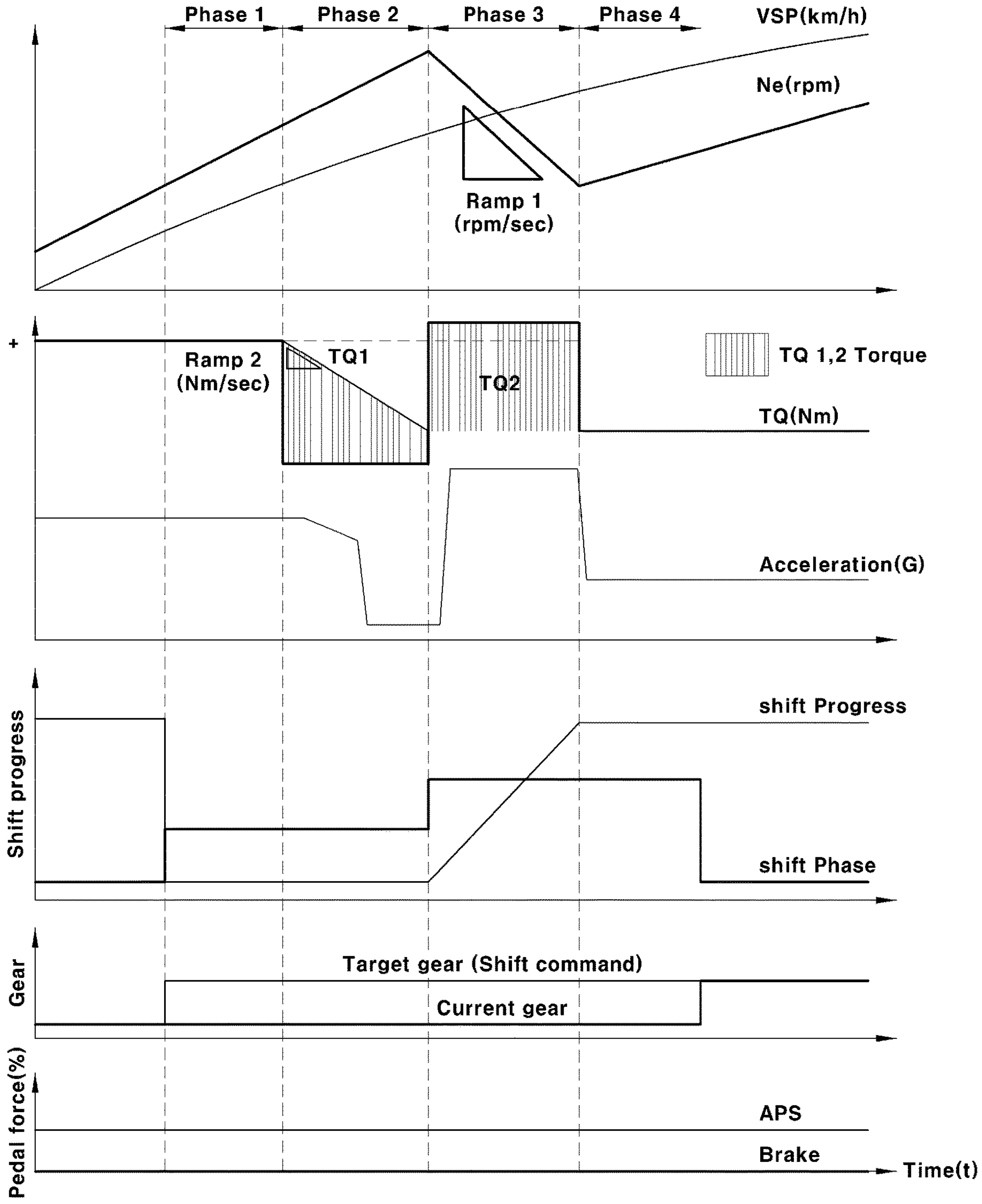
FIG. 6 shows changes in virtual shift information and drive information of an electric vehicle as time passes in a push-feel control mode according to an embodiment of the present disclosure.

Referring to FIG. 5 and FIG. 6, according to an embodiment of the present disclosure, Phase I through Phase IV in a normal control mode proceed similarly in a push-feel control mode. However, torque control is differently performed in Phase II and Phase III, so that push feel may be provided in the push-feel control mode, and a shifting sensation may be provided differently depending on the opening amount of the accelerator pedal and the gear position.

In response to the set condition being satisfied at operation S320, the controller 100 enters the push-feel control mode.

In Phase I, a shift command from the current virtual gear position to the target virtual gear position is provided to the controller 100. In response to the shift command, the controller 100 maintains the torque at an initial torque $TQ_n$ required at the current gear position in the duration of Phase I at operation S510.

The controller 100 is configured to determine whether a predetermined time period has passed since entering Phase I at operation S520. After proceeding Phase I for the predetermined time period, the controller 100 ends Phase I.

At operation S530, the controller 100 enters Phase II. Phase 2 is a torque transition section, and the controller 100 may perform a control of reducing the torque from the initial torque $TQ_n$ to a final torque $TQ_{n+1}$. As described above, the initial torque $TQ_n$ is a torque required at a current gear position, and the final torque $TQ_{n+1}$ is a torque required at a target gear position.

As illustrated, the torque TQ in Phase II generally decreases in proportion to Ramp 2 as time passes. The torque TQ changing along the slope of Ramp 2 becomes a reference torque. In the push-feel control mode also, Ramp 2 may be determined according to Equation 1.

However, according to a predetermined map, a first correction map factor A1 is reflected on a detailed shifting sensation as time passes and the torque of the motor 130 may be controlled according to Equation 4.

$$TQ = \{TQ_n + (\text{Ramp } 2)\cdot t\} + TQ1\cdot A1, \quad \text{[Equation 4]}$$

In the push-feel control mode, the controller 100 is configured to perform a control of reducing the torque in Phase II to the final torque $TQ_{n+1}$ or below to secure a torque margin for generating a push-feel shifting sensation.

At operation S540, the controller 100 is configured to determine whether a predetermined time period has passed since entering Phase II. After proceeding Phase II for the predetermined time period, the controller 100 ends Phase II.

At operation S550, the controller 100 enters Phase III. Phase III is a virtual engine speed transition section, and the virtual engine speed changes based on a set slope from the virtual engine speed $Ne_n$ in the current gear position to the virtual engine speed $Ne_{n+1}$ in the target gear position. Phase III is a section where the virtual engine speed Ne decreases. During Phase 3, the virtual engine speed Ne may generally decrease in proportion to Ramp 1. The controller 100 may convert the time at which transition of the virtual engine speed Ne occurs into a shift progress rate and may perform a torque control based on the converted shift progress rate.

A detailed shifting sensation as time passes may be generated using a displayed TQ2 value. Here, TQ2 is the absolute torque in Phase III. Torque TQ in Phase III may be obtained according to Equation 5.

$$TQ = TQ_{n+1} + TQ2 \cdot A2, \quad \text{[Equation 5]}$$

wherein A2 is a factor which is multiplied by TQ2 according to the correlation between gear position and virtual engine speed. According to an embodiment of the present disclosure, to generate a push-feel shifting sensation, the controller 100 is configured to perform a control of increasing the torque in Phase 3 to the initial torque $TQ_n$ required in the current virtual gear position or above.

At operation S560, the controller 100 is configured to determine whether the virtual engine speed Ne has reached the virtual engine speed $Ne_{n+1}$ at the target gear position. When it is determined that Ne has reached $Ne_{n+1}$, the controller 100 ends Phase III.

At operation S570, the controller 100 enters Phase IV. In Phase IV, the controller 100 synchronizes the torque to the final torque $TQ_{n+1}$ required at the target gear position and ends the push-feel control mode.

Figure 7:
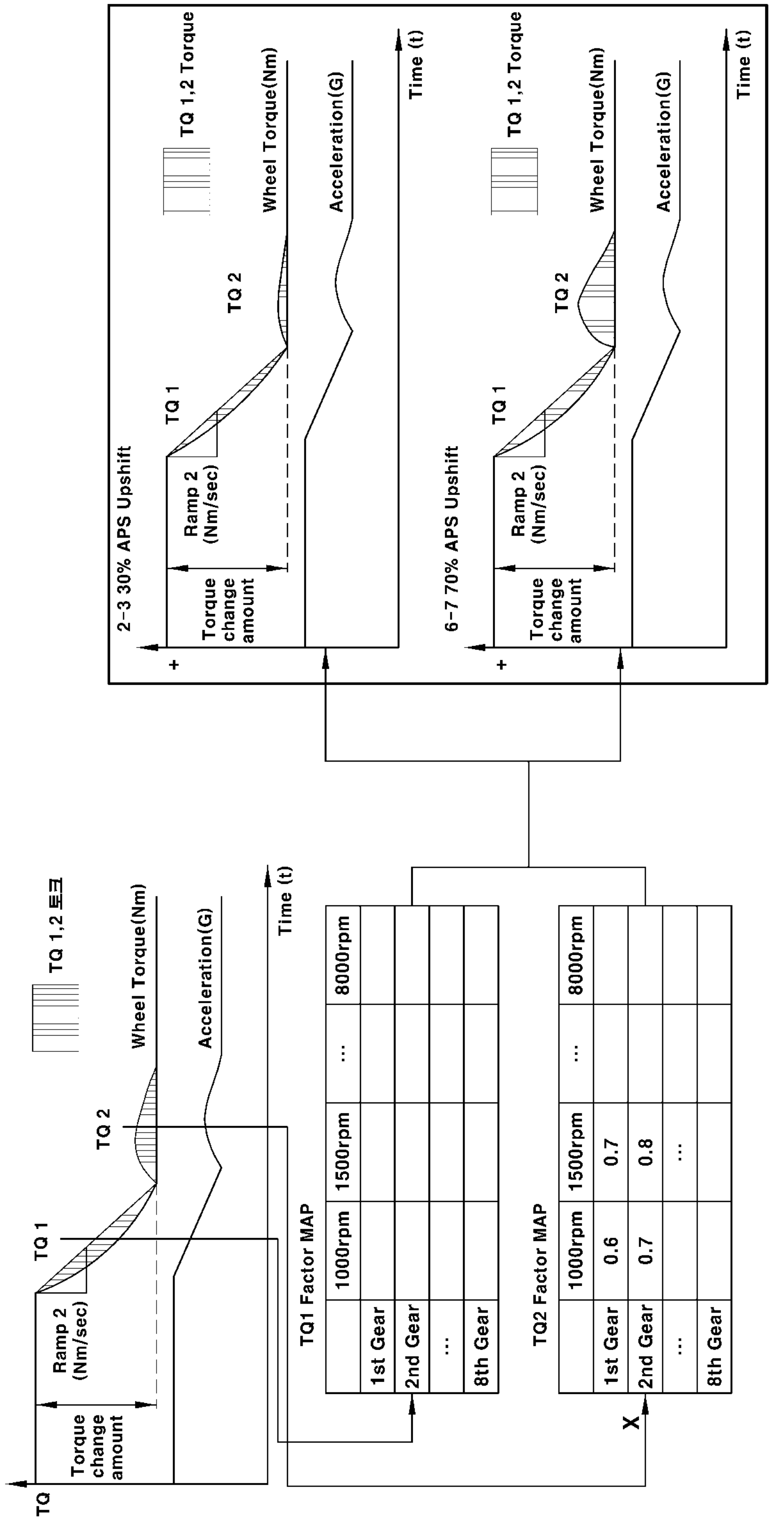
FIG. 7 shows changes in virtual shift information and drive information of an electric vehicle according to an embodiment of the present disclosure.

Referring to FIG. 7, according to an embodiment of the present disclosure, correction map factors A1 and A2 may change depending on the current gear position and virtual engine speed. Generally, when the amount of torque change before shifting and the amount of torque change after shifting are the same, TQ1 and TQ2 including the same value were used, regardless of the current virtual gear position or the opening amount of the accelerator pedal. Therefore, there was a limit in differentiating a shifting sensation.

However, according to an embodiment of the present disclosure, by use of the correction map factors applied to TQ1 in Phase 2 and TQ2 in Phase 3, which are absolute torques to generate a shifting sensation, a shifting sensation may be differently provided depending on the current gear position and virtual engine speed.

As explained, each map for TQ1 and TQ2 is determined by virtual gear position and virtual engine speed. According to an embodiment of the present disclosure, the shifting sensation may be differentiated by multiplying TQ1 by a correction map factor corresponding to the gear position and virtual engine speed at the time of shift command to reduce or amplify the values of TQ1 and TQ2 is given.

For example, it is assumed that the amount of torque change before shifting and the amount of torque change after shifting are the same in a first case where the virtual gear shifts up from second gear to third gear and the opening amount of the accelerator pedal is 30%, and a second case where the virtual gear shifts up from sixth gear to seventh gear and the opening amount of the accelerator pedal is 70%. Here, the shifting sensation may be differentiated by changing the correction map factor as in the example shown.

According to an embodiment of the present disclosure, a shifting sensation may be differently provided depending on the driving condition of the electric vehicle. Accordingly, a driver of the electric vehicle may experience sporty and dynamic driving like in an internal combustion engine vehicle.

As is apparent from the above description, the present disclosure provides the following effects.

According to an embodiment of the present disclosure, provided is a system and method for controlling an electric vehicle, configured for providing a shifting sensation occurred in an internal combustion engine vehicle to the electric vehicle.

According to an embodiment of the present disclosure, a driver of the electric vehicle may experience sporty and dynamic driving like in an internal combustion engine vehicle.

The system and method for controlling an electric vehicle according to an embodiment of the present disclosure may improve the marketability of the electric vehicle.

Effects of the present disclosure are not limited to what has been described above, and other effects not mentioned herein will be clearly recognized by those skilled in the art based on the above description.

Furthermore, the term related to a control device such as "controller", "control apparatus", "control unit", "control device", "control module", "control circuit", or "server", etc refers to a hardware device including a memory and a processor configured to execute one or more steps interpreted as an algorithm structure. The memory stores algorithm steps, and the processor executes the algorithm steps to perform one or more processes of a method in accordance with various embodiments of the present disclosure. The control device according to embodiments of the present disclosure may be implemented through a nonvolatile memory configured to store algorithms for controlling operation of various components of a vehicle or data about software commands for executing the algorithms, and a processor configured to perform operation to be described above using the data stored in the memory. The memory and the processor may be individual chips. Alternatively, the memory and the processor may be integrated in a single chip. The processor may be implemented as one or more processors. The processor may include various logic circuits and operation circuits, may be configured for processing data according to a program provided from the memory, and may be configured to generate a control signal according to the processing result.

The control device may be at least one microprocessor operated by a predetermined program which may include a series of commands for carrying out the method included in the aforementioned various embodiments of the present disclosure.

The aforementioned invention can also be embodied as computer readable codes on a computer readable recording medium. The computer readable recording medium is any data storage device that can store data which may be thereafter read by a computer system and store and execute program instructions which may be thereafter read by a computer system. Examples of the computer readable recording medium include Hard Disk Drive (HDD), solid state disk (SSD), silicon disk drive (SDD), read-only memory (ROM), random-access memory (RAM), CD-ROMs, magnetic tapes, floppy discs, optical data storage devices, etc and implementation as carrier waves (e.g., transmission over the Internet). Examples of the program instruction include machine language code such as those generated by a compiler, as well as high-level language code which may be executed by a computer using an interpreter or the like.

In various embodiments of the present disclosure, each operation described above may be performed by a control device, and the control device may be configured by a plurality of control devices, or an integrated single control device.

In various embodiments of the present disclosure, the memory and the processor may be provided as one chip, or provided as separate chips.

In various embodiments of the present disclosure, the scope of the present disclosure includes software or machine-executable commands (e.g., an operating system, an application, firmware, a program, etc.) for enabling operations according to the methods of various embodiments to be executed on an apparatus or a computer, a non-transitory computer-readable medium including such software or commands stored thereon and executable on the apparatus or the computer.

In various embodiments of the present disclosure, the control device may be implemented in a form of hardware or software, or may be implemented in a combination of hardware and software.

Furthermore, the terms such as "unit", "module", etc. included in the specification mean units for processing at least one function or operation, which may be implemented by hardware, software, or a combination thereof.

In the flowchart described with reference to the drawings, the flowchart may be performed by the controller or the processor. The order of operations in the flowchart may be changed, multiple operations may be merged, or any operation may be divided, and a specific operation may not be performed. Furthermore, the operations in the flowchart may be performed sequentially, but not necessarily performed sequentially. For example, the order of the operations may be changed, and at least two operations may be performed in parallel.

Hereinafter, the fact that pieces of hardware are coupled operably may include the fact that a direct and/or indirect connection between the pieces of hardware is established by wired and/or wirelessly.

In an embodiment of the present disclosure, the vehicle may be referred to as being based on a concept including various means of transportation. In some cases, the vehicle may be interpreted as being based on a concept including not only various means of land transportation, such as cars, motorcycles, trucks, and buses, that drive on roads but also various means of transportation such as airplanes, drones, ships, etc.

For convenience in explanation and accurate definition in the appended claims, the terms "upper", "lower", "inner", "outer", "up", "down", "upwards", "downwards", "front", "rear", "back", "inside", "outside", "inwardly", "outwardly", "interior", "exterior", "internal", "external", "forwards", and "backwards" are used to describe features of the embodiments with reference to the positions of such features as displayed in the figures. It will be further understood that the term "connect" or its derivatives refer both to direct and indirect connection.

The term "and/or" may include a combination of a plurality of related listed items or any of a plurality of related listed items. For example, "A and/or B" includes all three cases such as "A", "B", and "A and B".

In embodiments of the present disclosure, "at least one of A and B" may refer to "at least one of A or B" or "at least one of combinations of at least one of A and B". Furthermore, "one or more of A and B" may refer to "one or more of A or B" or "one or more of combinations of one or more of A and B".

In the present specification, unless stated otherwise, a singular expression includes a plural expression unless the context clearly indicates otherwise.

In the embodiment of the present disclosure, it should be understood that a term such as "include" or "have" is directed to designate that the features, numbers, steps, operations, elements, parts, or combinations thereof described in the specification are present, and does not preclude the possibility of addition or presence of one or more other features, numbers, steps, operations, elements, parts, or combinations thereof.

According to an embodiment of the present disclosure, components may be combined with each other to be implemented as one, or some components may be omitted.

The foregoing descriptions of specific embodiments of the present disclosure have been presented for purposes of illustration and description. They are not intended to be exhaustive or to limit the present disclosure to the precise forms disclosed, and obviously many modifications and variations are possible in light of the above teachings. The embodiments were chosen and described in order to explain certain principles of the invention and their practical application, to enable others skilled in the art to make and utilize various embodiments of the present disclosure, as well as various alternatives and modifications thereof. It is intended that the scope of the present disclosure be defined by the Claims appended hereto and their equivalents.

What is claimed is:

1. A method for controlling an electric vehicle, the method comprising:
- obtaining, by a controller, virtual shift information based on drive information of the electric vehicle;
- detecting, by the controller, a power-on upshift based on the virtual shift information;
- in response to the detecting of the power-on upshift, determining, by the controller, whether a set condition for push-feel control is satisfied; and
- based on whether the set condition is satisfied, performing, by the controller, control of a torque for a motor of the electric vehicle in one of a normal control mode or a push-feel control mode,
- wherein the detecting of the power-on upshift includes:
  - determining whether a virtual gear position in the virtual shift information requires an increase from a current gear position to a target gear position.

2. The method of claim 1, wherein the set condition is determined based on the drive information and the virtual shift information.

3. The method of claim 1, wherein the set condition is determined based on a drive mode selected by a driver of the electric vehicle, an opening amount of an accelerator pedal of the electric vehicle, a steering angle of the electric vehicle, and a virtual engine speed of the electric vehicle.

4. The method of claim 1, wherein the virtual shift information includes a virtual gear position of the electric vehicle and a virtual engine speed at the virtual gear position.

5. The electric vehicle including the motor controlled by the method of claim 1.

6. The method of claim 1, wherein the normal control mode and the push-feel control mode include:
- a first phase of maintaining the torque at an initial torque which is required at the current gear position;
- a second phase of reducing the torque from the initial torque to a final torque which is required at the target gear position;
- a third phase including at least partially increasing the torque from the final torque by a set torque; and
- a fourth phase of maintaining the torque at the final torque.

7. The method of claim 6, wherein, in the second phase in the normal control mode, the torque is linearly reduced from the initial torque to the final torque, and a map factor depending on an amount of change in the torque during the reduction is reflected to the torque.

8. The method of claim 6, wherein in the second phase of the push-feel control mode, the torque is reduced from the initial torque to the final torque, during which the second phase includes a portion of reducing the torque smaller than the final torque.

9. The method of claim 6, wherein, in the second phase in the push-feel control mode, the torque is reduced from the initial torque to the final torque, during which a correction map factor determined based on an amount of change from the initial torque to the final torque and a current gear position and a virtual engine speed in the virtual shift information are reflected to the torque.

10. The method of claim 6, wherein, in the third phase in the normal control mode, the torque is controlled based on a virtual engine speed in the virtual shift information, and a map factor determined based on an amount of change from the initial torque to the final torque is reflected to the torque.

11. The method of claim 6, wherein, in the third phase in the push-feel control mode, the torque is controlled based on a virtual engine speed in the virtual shift information, and a correction map factor determined based on an amount of change from the initial torque to the final torque and a current gear position and the virtual engine speed in the virtual shift information are reflected to the torque.

12. The method of claim 6, wherein the third phase in the push-feel control mode includes a portion where the torque is increased greater than the initial torque.

13. The method of claim 6, wherein the third phase is ended in response to concluding that a virtual engine speed in the virtual shift information reaches a virtual engine speed at the target gear position.

14. A system for controlling an electric vehicle, the system comprising:

a virtual shift system configured to obtain virtual shift information of the electric vehicle based on drive information of the electric vehicle; and a controller configured to determine whether a virtual shifting is performed based on the virtual shift information, wherein the controller is programmed to:

detect a power-on upshift based on the virtual shift information;

in response to the detecting of the power-on upshift, determine whether a set condition for push-feel control is satisfied; and based on whether the set condition is satisfied, control a torque for a motor of the electric vehicle in one of a normal control mode or a push-feel control mode, wherein the power-on upshift is determined based on whether a virtual gear position in the virtual shift information requires an increase from a current gear position to a target gear position while an accelerator pedal of the electric vehicle is applied.

15. The system of claim 14, wherein the set condition is determined based on a drive mode selected by a driver of the electric vehicle, an opening amount of an accelerator pedal of the electric vehicle, a steering angle of the electric vehicle, and a virtual engine speed of the electric vehicle.

16. The system of claim 14, wherein the virtual shift information includes a virtual gear position of the electric vehicle and a virtual engine speed at the virtual gear position.

17. The system of claim 16, wherein, in the push-feel control mode, the torque of the motor is corrected based on a current virtual gear position and a virtual engine speed in the virtual shift information.

18. The system of claim 16, wherein, in the push-feel control mode, the torque of the motor is corrected based on a current virtual gear position in the virtual shift information and an opening amount of an accelerator pedal of the electric vehicle.

* * * * *